United States Patent
Moore et al.

(10) Patent No.: US 11,775,561 B2
(45) Date of Patent: Oct. 3, 2023

(54) EXTENSIBLE FILE SYNCHRONIZATION

(71) Applicant: ADOBE INC., San Jose, CA (US)

(72) Inventors: Neil Moore, Edinburgh (GB); Adrian O'Lenskie, West Lothian (GB); Peter Brown, Dunblane (GB)

(73) Assignee: ADOBE, INC., San Jose, CA (US)

( * ) Notice: Subject to any disclaimer, the term of this patent is extended or adjusted under 35 U.S.C. 154(b) by 8 days.

(21) Appl. No.: 17/142,773

(22) Filed: Jan. 6, 2021

(65) Prior Publication Data
US 2021/0124763 A1    Apr. 29, 2021

Related U.S. Application Data

(63) Continuation of application No. 15/293,109, filed on Oct. 13, 2016, now Pat. No. 10,902,019.

(51) Int. Cl.
*G06F 16/27* (2019.01)
*G06F 16/178* (2019.01)

(52) U.S. Cl.
CPC .......... *G06F 16/275* (2019.01); *G06F 16/178* (2019.01)

(58) Field of Classification Search
CPC .................................................. G06F 16/275
See application file for complete search history.

(56) References Cited

U.S. PATENT DOCUMENTS

| | | | |
|---|---|---|---|
| 6,393,434 B1 | 5/2002 | Huang et al. | |
| 8,949,179 B2 * | 2/2015 | Besen | G06F 16/1794 |
| | | | 707/610 |
| 9,424,112 B1 * | 8/2016 | Malamut | G06F 9/541 |
| 9,565,246 B1 * | 2/2017 | Tsypliaev | H04L 67/10 |
| 9,672,261 B2 | 6/2017 | Holmes-Higgin et al. | |
| 2006/0041893 A1 | 2/2006 | Castro et al. | |
| 2006/0123010 A1 | 6/2006 | Landry et al. | |
| 2007/0038642 A1 | 2/2007 | Durgin et al. | |
| 2007/0088707 A1 | 4/2007 | Durgin et al. | |
| 2007/0094211 A1 | 4/2007 | Sun et al. | |
| 2013/0013560 A1 | 1/2013 | Goldberg et al. | |
| 2014/0298289 A1 | 10/2014 | Graf et al. | |
| 2015/0012488 A1 | 1/2015 | Van Rossum | |
| 2017/0185643 A1 | 6/2017 | Doshi et al. | |
| 2018/0107560 A1 | 4/2018 | Moore et al. | |

* cited by examiner

*Primary Examiner* — Brittany N Allen
(74) *Attorney, Agent, or Firm* — F. CHAU & ASSOCIATES, LLC

(57) ABSTRACT

Systems and methods provide custom synchronization procedures in file synchronization. A primary agent is used to monitor for changes, create synchronization plans to synchronized changes, and execute the synchronization plan. The primary agent, however, interacts with one or more separate custom agents to customize the synchronization plans. One exemplary technique involves monitoring for local changes to a first copy of a file tree and updates from another computing device regarding remote changes to a second copy of the file tree. When a change to either copy is identified, a synchronization plan for the change is created based on a default synchronization procedure. The synchronization plan is sent to a custom agent for customization. The custom agent creates the custom synchronization plan by modifying the synchronization plan and sends the custom synchronization plan to the primary agent. The custom synchronization plan is then executed by the primary agent.

19 Claims, 7 Drawing Sheets

EXTENSIBLE FILE SYNCHRONIZATION

CROSS REFERENCES

This application claims priority to, and the benefit of, U.S. application Ser. No. 15/293,109, filed on Oct. 13, 2016 entitled EXTENSIBLE FILE SYNCHRONIZATION. The entire contents of the foregoing application are hereby incorporated by reference for all purposes.

TECHNICAL FIELD

This disclosure relates generally to computer-implemented techniques and more particularly relates to improving the efficiency and effectiveness of computing systems used to synchronize files on multiple computing devices and in cloud computing systems.

BACKGROUND

File synchronization is the task of keeping a file tree of files and folders on one computing device the same as a file tree on another computing device, as changes are made to the copies of the file tree on either of the computing devices. For example, a file tree can be stored on both a client device and a cloud server and synchronized between the two computing devices. Typically, synchronization is achieved by a synchronization agent running on a computing device. The agent monitors local changes and receives updates from the other computing device to synchronize the file tree copies. Acting on this information, the agent will affect uploads and downloads to bring the copies of the file tree into line on the computing devices. File synchronization functions are generally provided by a single agent using a one-size-fits-all synchronization algorithm. However, the files and folders that are synchronized are often used by multiple applications and for various purposes that may require synchronization procedures that differ from the standard ones provided by the algorithm. Applications and businesses processes that are used in coordination with the file synchronization system have their own requirements for synchronization in particular circumstances. For example, these synchronization procedure sources (i.e., the applications and business processes) can require custom synchronization procedures for specific file types, specific files, and/or specific folders. For example, a specific application, such as a video editing application, may require synchronizing changes of its files on-demand rather than using the standard algorithm's as-soon-as-possible procedure. As another example, particular parts of a file tree may be synchronized in a unique way, for example, based on a procedure that only downloads and uploads files under a particular size.

Existing systems implement custom synchronization procedures by directly modifying the synchronization algorithm used by the synchronization agent to account for each added custom synchronization procedure. If there is a variation in procedure for a particular folder, e.g., one-way synchronization, then this is activated either by incorporating specific logic into the source code or by creating configuration options specifically to handle the particular variation. Similarly, in order to achieve file synchronization with special handling for particular areas of the file tree, existing systems will combine unrelated logic into the single agent. For example, selective synchronization is a custom synchronization procedure in which particular parts of the file tree are not synchronized either up (i.e., from client to server) or down (i.e., from server to client). The implementation logic is different from conventional synchronization in which the file tree is fully downloaded/uploaded. Selective synchronization has been implemented by combining logic specific to selective synchronization into the agent.

There are several disadvantages to implementing custom synchronization procedures from synchronization procedure sources by directly modifying the synchronization agent. Such modifications require programming time and expertise with the synchronization system's configuration and programming language. Moreover, the synchronization procedure sources are generally external to the development of the file synchronization system. The synchronization procedures can come from a synchronization procedure source such as an application that uses a different programming language than the synchronization system or from a separate business entity or team. Implementing custom synchronization procedures in such circumstances can require the involvement of multiple people having different backgrounds, entity affiliations, team affiliations, and technical experience. The complexity and multiple people involved in such customization makes it inefficient. In addition, licensing restrictions can prevent incorporating code from another application (e.g., an application that uses open source code) into a content synchronization system to implement custom procedures. Thus, generally, existing techniques for implementing custom synchronization procedures from synchronization procedure sources by directly modifying the file synchronization system's agent is often burdensome, impractical, infeasible, and/or impossible.

SUMMARY

Systems and methods disclosed herein provide custom synchronization procedures in file synchronization. In certain techniques, a primary agent monitors for changes, creates synchronization plans to synchronized changes, and executes the synchronization plans. The primary agent interacts with separate custom agents to customize the synchronization plans. One exemplary technique involves monitoring for local changes to a first copy of a file tree and monitoring for updates from another computing device regarding remote changes to a second copy of the file tree. When a change to the first copy of the file tree or the second copy of the file tree is identified, a synchronization plan for the change is created by the primary agent based on a default synchronization procedure. The synchronization plan is sent to a custom agent for customization. The custom agent creates the custom synchronization plan by modifying the synchronization plan and sends the custom synchronization plan to the primary agent. The custom synchronization plan is then executed by the primary agent.

Certain techniques of the invention additionally or alternatively provide delegated synchronization procedures in a file synchronization system. One exemplary technique involves receiving registration by a delegate to control synchronization of a portion of a file tree. The primary agent keeps track of multiple delegates registering for various portions of the file tree. Local changes to a first copy of a file tree and updates from another computing device regarding remote changes to a second copy of the file tree are monitored. When a change to the first copy of the file tree or the second copy of the file tree is identified, the delegate that is responsible for synchronization related to the change is determined based on the registration. A notification of the change is then sent to that delegate. Based on receiving the notification, the delegate develops a delegate-specified synchronization plan for the change and instructs the primary agent to execute the delegate-specified synchronization plan. The plan is executed to synchronize the first copy and second copy of the file tree.

These illustrative features are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
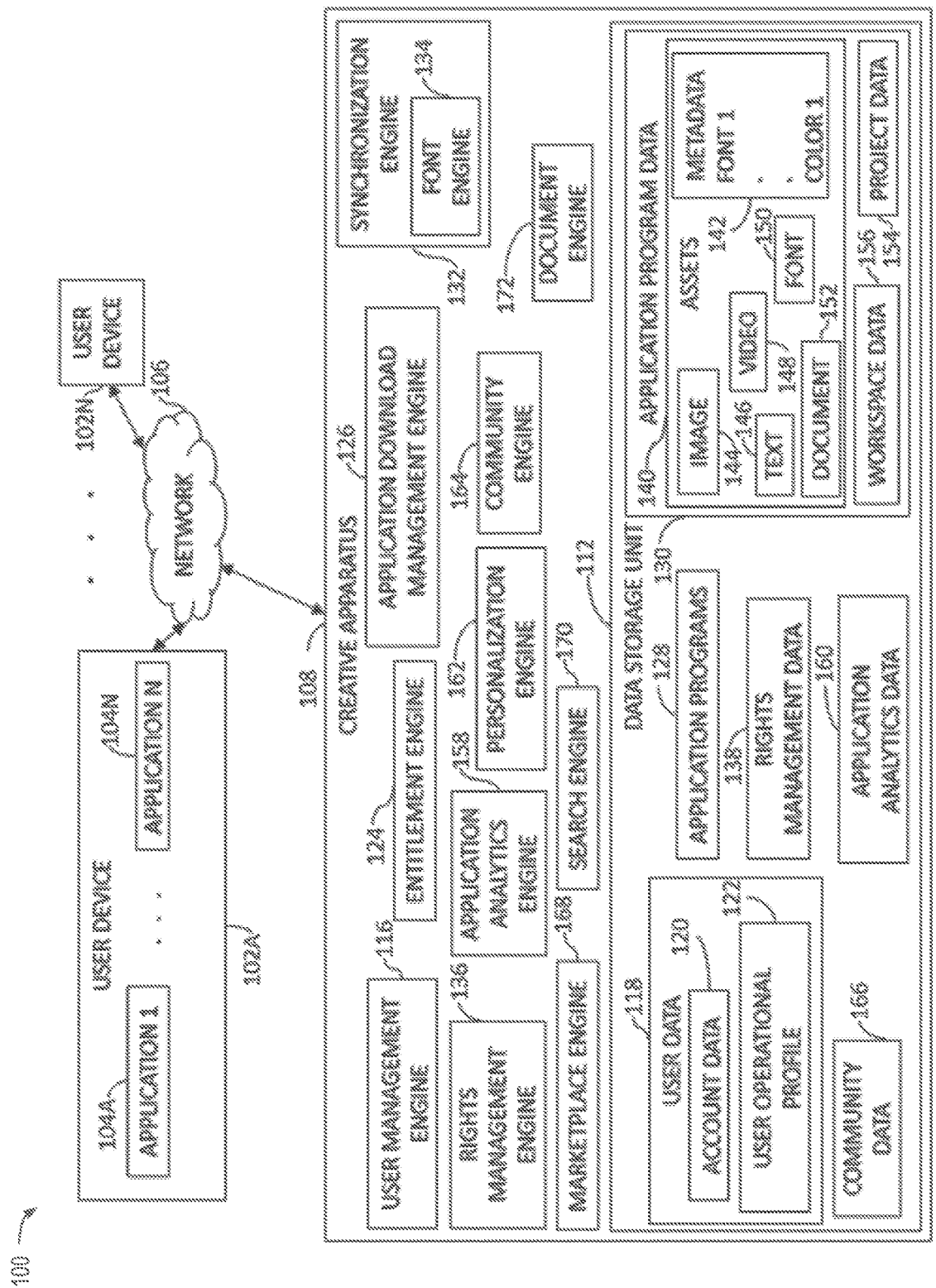
FIG. 1 is a diagram of an environment in which one or more embodiments of the present disclosure can be practiced.

As discussed above, existing techniques for implementing custom synchronization procedures from synchronization procedure sources by directly modifying the file synchronization system's agent is often burdensome, impractical, infeasible, and/or impossible. The invention provides improved techniques for implementing file synchronization using a file synchronization system.

Certain techniques of the invention provide an extensibility point m a file synchronization system. This allows one or more synchronization procedure sources (i.e., applications and business processes) to implement custom synchronization procedures for certain files, file types, folders, etc. The file synchronization system includes a primary agent that is configured to perform default synchronization procedures. The primary agent, however, also communicates with separate, custom agents to identify changes to the default procedures. These custom agents can be provided by a file synchronization procedure source (e.g., application, business unit, team, etc.) that are separate from the file synchronization system and/or can be written in program languages different from that of the file synchronization system and one another.

The following provides an example technique for using custom agents separate from the primary agent to implement custom synchronization procedures. In this example technique, the primary agent monitors local changes and receives updates from the other computing device to identify an event that may require synchronization. The primary agent creates a representation of a synchronization plan based on a default synchronization procedure. The primary agent sends the synchronization plan to the custom agents for customization. Each of the custom agents determines whether to respond with changes to the synchronization plan. For example, a custom agent can be configured to identify synchronizations that involve "read only" files and modify synchronizations involving those files. Thus, if that custom agent receives a synchronization plan from the primary agent that relates to a "read only" file synchronization, that custom agent will modify the synchronization plan to customize it and return the customized synchronization plan to the primary agent for execution. The primary agent receives the customized synchronization plan, checks for validity, and executes the plan.

Certain techniques of the invention implement custom synchronization procedures by delegating synchronization tasks to be controlled by separate delegate agents rather than by the primary agent. The delegates register for particular portions of the synchronized file tree, receive notifications when there are events that may require synchronization to their respective portions of the synchronized file tree, and execute the appropriate updates according to their own custom synchronization procedures. The use of separate delegates enables easier custom synchronization procedure implementation, as well as parallel and prioritized synchronization control. Certain techniques address potential conflicts, for example, when an event could potentially impact files in portions of the synchronized file tree controlled by multiple delegates. For example, a move event that involves two delegates is separated into a delete event (handled by one of the delegates) and a create event (handled by the other delegate).

Techniques of the invention provide numerous advantages over prior techniques. Techniques of the invention provide more efficient and easier ways to extend a file synchronization system with custom agent synchronization procedures from multiple and differing synchronization procedure sources. The custom synchronization procedures can be created by different companies or teams. The custom synchronization procedures can additionally or alternatively be implemented using different technologies that may be impossible to combine or uneconomical to combine, e.g., JavaScript and C++. The custom synchronization procedures can additionally or alternatively be implemented at different times. The separation of the custom agents and delegates from the file synchronization system's primary agent enables easier, more efficient implementation of custom synchronization procedures. The separation also allows custom synchronization procedures to be used in circumstances in which it was previously impossible, for example, where license requirements would have prevented directly modifying the file synchronization system's agent. In addition, the custom agents and delegates of the techniques of the invention can be implemented on separate devices and controlled remotely from client devices. This allows bug fixes and procedure changes to be made at any time, rather than requiring waiting for client-side file synchronization software to be updated.

As used herein, the phrase "computing device" refers to any electronic component, machine, equipment, or system that can be instructed to carry out operations. Computing devices will typically, but not necessarily, include a processor that is communicatively coupled to a memory and that executes computer-executable program code and/or accesses information stored in memory or other storage. Examples of computing devices include, but are not limited to, desktop computers, laptop computers, server computers, tablets, telephones, mobile telephones, televisions, portable data assistant (PDA), e-readers, portable game units, smart watches, etc.

As used herein, the phrase "file tree" refers to an organization structure that relates one or more files and/or folders to one another. Files store electronic content as individually accessible units and folders identify groups of files and other folders. An example file tree includes a root folder that identifies zero and/or more files and zero or more sub-folders, with each sub-folder identifying zero or more files and zero or more sub-sub-folders, etc.

As used herein, the phrase "file synchronization system" refers to computing components used to synchronize a file tree on multiple computing devices. File synchronization can be one-way (i.e., updated file trees files and folders updated from a source to another computing device) or two-way (i.e., updated file tree files and folders copied in both directions between the computing devices).

As used herein, the phrase "synchronization plan" refers to a set or ordering of one or more actions to be executed to accomplish a synchronization. A "default" synchronization is a synchronization plan that will be executed if a custom synchronization plan does not replace it. A "custom" synchronization plan is a plan that implements a custom synchronization procedure, for example, by modifying a default synchronization plan based on a custom synchronization procedure. A synchronization plan can be represented using a directed acyclic graph (DAG).

As used herein, the phrase "directed acyclic graph (DAG)" refers to is a graph of nodes and edges that does not include directed cycles, i.e., there is no way to go from a first node through the edges and other nodes to get back to the first node. Equivalently, a DAG is a directed graph that has a topological ordering, a sequence of the nodes such that every edge is directed from earlier to later in the sequence. A synchronization plan can be encoded as a directed acyclic graph (DAG) where each node represents a synchronization action such as upload, download or create directory. The synchronization executor's job is to process this DAG in a topologically sorted order, so that if there is an edge from node A (action A) to node B (action B), then action A must be done before action B.

As used herein, the phrase "primary agent" refers to one or more processes performed locally by a computing device to manage the synchronization of a copy of a file tree on the computing device with copies on one or more other computing devices. A primary agent can, but need not necessarily, monitor local and remote copies of file trees for changes, create default synchronization plans, communicate with custom agents to obtain custom synchronization plans, execute default and/or custom synchronization plans, track delegates, delegate synchronization activities to delegates, and/or report on synchronization progress. In one example, the primary agent is implemented as a primary daemon, running the background on a computing device.

As used herein, the phrase "custom agent" refers to one or more processes performed separately from the primary agent by the same or another computing device to use a custom synchronization procedure to provide a custom synchronization plan. A custom agent can implement a custom synchronization procedure provided by a synchronization procedure source that is different from a source that provides default synchronization procedures. A custom agent can be, but is not necessarily, implemented in a different programming language than the programming language used to implement the primary agent.

As used herein, the phrase "synchronization procedure source" refers to a supplier (e.g., person, team, business unit, business entity, application, etc.) of a synchronization procedure. For example, a developer or development team creating a file synchronization system can be the synchronization procedure source for default synchronization procedures of the system. In this example, custom synchronization procedures are provided by other synchronization procedure sources, including but not limited to different developers, development teams, business units, business entities, applications, etc.

As used herein, the phrase "delegate" refers to one or more processes performed separately from the primary agent on the same or another computing device to synchronize a designated portion of a file tree.

FIG. 1 is a diagram of an environment 100 in which one or more embodiments of the present disclosure can be practiced. The environment 100 includes one or more user devices, such as a user device 102A up to a user device 102N. Each of the user device is connected to a creative apparatus 108 via a network 106. A user of the user devices uses various products, applications, or services supported by the creative apparatus 108 via the network 106. The user devices correspond to various users. Examples of the users include, but are not limited to, creative professionals or hobbyists who use creative tools to generate, edit, track, or manage creative content, end users, administrators, users who use document tools to create, edit, track, or manage documents, advertisers, publishers, developers, content owners, content managers, content creators, content viewers, content consumers, designers, editors, any combination of these users, or any other user who uses digital tools to create, edit, track, or manage digital experiences.

Digital tool, as described herein, includes a tool that is used for performing a function or a workflow electronically. Examples of the digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. Digital tools include the creative apparatus 108.

Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, image, video, web site, webpage, user interface, menu item, tool menu, magazine, slideshow, animation, social post, comment, blog, data feed, audio, advertisement, vector graphic, bitmap, document, any combination of one or more content, or any other electronic content.

Examples of the user devices include, but are not limited to, a personal computer (PC), tablet computer, a desktop computer, a processing unit, any combination of these devices, or any other suitable device having one or more processors. Each user device includes at least one application supported by the creative apparatus 108.

It is to be appreciated that following description is now explained using the user device 102A as an example and any other user device can be used.

Examples of the network 106 include, but are not limited to, internet, local area network (LAN), wireless area network, wired area network, wide area network, and the like.

The creative apparatus 108 includes one or more engines for providing one or more digital experiences to the user. The creative apparatus 108 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. The creative apparatus 108 also includes a data storage unit 112. The data storage unit 112 can be implemented as one or more databases or one or more data servers. The data storage unit 112 includes data that is used by the engines of the creative apparatus 108.

A user of the user device 102A visits a webpage or an application store to explore applications supported by the creative apparatus 108. The creative apparatus 108 provides the applications as a software as a service (SaaS), or as a standalone application that can be installed on the user device 102A, or as a combination. The user creates an account with the creative apparatus 108 by providing user details and also by creating login details. Alternatively, the creative apparatus 108 can automatically create login details for the user in response to receipt of the user details. In some embodiments, the user is also prompted to install an application manager. The application manager enables the user to manage installation of various applications supported by the creative apparatus 108 and also to manage other functionalities, such as updates, subscription account and the like, associated with the applications. The user details are received by a user management engine 116 and stored as user data 118 in the data storage unit 112. In some embodiments, the user data 118 further includes account data 120 under which the user details are stored.

The user can either opt for a trial account or can make payment based on type of account or subscription chosen by the user. Alternatively, the payment can be based on product or number of products chosen by the user. Based on payment details of the user, a user operational profile 122 is generated by an entitlement engine 124. The user operational profile 122 is stored in the data storage unit 112 and indicates entitlement of the user to various products or services. The user operational profile 122 also indicates type of user, i.e. free, trial, student, discounted, or paid.

The user management engine 116 and the entitlement engine 124 can be one single engine performing the functionalities of both the engines.

The user then installs various applications supported by the creative apparatus 108 via an application download management engine 126. Application installers or application programs 128 present in the data storage unit 112 are fetched by the application download management engine 126 and made available to the user directly or via the application manager. In one embodiment, all application programs 128 are fetched and provided to the user via an interface of the application manager. In another embodiment, application programs 128 for which the user is eligible based on user's operational profile are displayed to the user. The user then selects the application programs 128 or the applications that the user wants to download. The application programs 128 are then downloaded on the user device 102A by the application manager via the application download management engine 126. Corresponding data regarding the download is also updated in the user operational profile 122. An application program 128 is an example of the digital tool. The application download management engine 126 also manages process of providing updates to the user device 102A.

Upon download, installation and launching of an application program, in one embodiment, the user is asked to provide the login details. A check is again made by the user management engine 116 and the entitlement engine 124 to ensure that the user is entitled to use the application program. In another embodiment, direct access is provided to the application program as the user is already logged into the application manager.

The user uses one or more application programs 128 to create one or more projects or assets. In addition, the user also has a workspace within each application program. The workspace, as described herein, includes setting of the application program, setting of tools or setting of user interface provided by the application program, and any other setting or properties specific to the application program. Each user has a workspace. The workspace, the projects or the assets are then stored as application program data 130 in the data storage unit 112 by a synchronization engine 132. The synchronization engine 132 also includes a font engine 134 for synchronizing or storing fonts included as part of the application program data 130. The application program data 130 can be specific to the user or can be shared with other users based on rights management. The rights management is performed by a rights management engine 136. Rights management rules or criteria are stored as rights management data 138 in the data storage unit 112.

The application program data 130 includes one or more assets 140. The assets 140 can be a shared asset which the user wants to share with other users or which the user wants to offer on a marketplace. The assets 140 can also be shared across multiple application programs 128. Each asset includes metadata 142. Examples of the metadata 142 include, but are not limited to, font, color, size, shape, coordinate, a combination of any of these, and the like. In addition, in one embodiment, each asset also includes a file. Examples of the file include, but are not limited to, an image 144, text 146, a video 148, a font 150, a document 152, a combination of any of these, and the like. In another embodiment, an asset only includes the metadata 142.

The application program data 130 also include project data 154 and workspace data 156. In one embodiment, the project data 154 includes the assets 140. In another embodiment, the assets 140 are standalone assets. Similarly, the workspace data 156 can be part of the project data 154 in one embodiment while it may be standalone data in another embodiment.

The user can have one or more user devices. The application program data 130 is accessible by the user from any device, i.e. including the device which was not used to create the assets 140. This is achieved by the synchronization engine 132 that stores the application program data 130 in the data storage unit 112 and makes the application program data 130 available for access by the user or other users via any device. Before accessing the application program data 130 by the user from any other device or by any other user, the user or the other user may need to provide login details for authentication if not already logged in. Else, if the user or the other user are logged in then a newly created asset or updates to the application program data 130 are provided in real time. The rights management engine 136 is also called to determine whether the newly created asset or the updates can be provided to the other user or not. The workspace data 156 enables the synchronization engine 132 to provide same workspace configuration to the user on any other device or to the other user based on the rights management data 138.

In various embodiments, various types of synchronization can be achieved. For example, the user can pick a font or a color from the user device 102A using a first application program and can use the font or the color in a second application program on any other device. If the user shares the font or the color with other users, then the other users can also use the font or the color. All this synchronization can happen in real time. Similarly, synchronization of any type of the application program data 130 can be performed.

In some embodiments, the user interaction with the application programs 128 is also tracked by an application analytics engine 158 and stored as application analytics data 160. The application analytics data 160 includes, for example, usage of a tool, usage of a feature, usage of a workflow, usage of the assets 140, and the like. The application analytics data 160 can include the usage data on a per user basis and can also include the usage data on a per tool basis or per feature basis or per workflow basis or any other basis. The application analytics engine 158 embeds a piece of code in the application programs 128 that enables an application program to collect the usage data and send it to the application analytics engine 158. The application analytics engine 158 stores the usage data as the application analytics data 160 and processes the application analytics data 160 to draw meaningful output. For example, the application analytics engine 158 can draw an output that the user uses "Tool 4" maximum number of times. The output of the application analytics engine 158 is used by a personalization engine 162 to personalize tool menu for the user to show "Tool 4" on top. Other types of personalization can also be performed based on the application analytics data 158. In addition, the personalization engine 162 can also use the workspace data 156 or the user data 118 including user preferences to personalize one or more application programs 128 for the user.

In some embodiments, the application analytics data 160 includes data indicating status of project of the user. For example, if the user was preparing an article in a digital publishing application and what was left was publishing the prepared article at the time the user quit the digital publishing application then the application analytics engine 158 tracks the state. Now when the user next opens the digital publishing application on another device then the user is indicated the state and options are provided to the user for publishing using the digital publishing application or any other application. In addition, while preparing the article recommendation can also be made by the synchronization engine 132 to incorporate some of other assets saved by the user and relevant for the article. Such recommendation can be generated using one or more engines as described herein.

The creative apparatus 108 also includes a community engine 164 which enables creation of various communities and collaboration among the communities. A community, as described herein, includes a group of users that share at least one common interest. The community can be closed, i.e. limited to a number of users or can be open, i.e. anyone can participate. The community enables the users to share each other's work and comment or like each other's work. The work includes the application program data 140. The community engine 164 stores any data corresponding to the community, such as work shared on the community and comments or likes received for the work as community data 166. The community data 166 also includes notification data and is used for notifying other users by the community engine in case of any activity related to the work or new work being shared. The community engine 164 works in conjunction with the synchronization engine 132 to provide collaborative workflows to the user. For example, the user can create an image and can request for some expert opinion or expert editing. An expert user can then either edit the image as per the user liking or can provide expert opinion. The editing and providing of the expert opinion by the expert is enabled using the community engine 164 and the synchronization engine 132. In collaborative workflows, each of a plurality of users are assigned different tasks related to the work.

The creative apparatus 108 also includes a marketplace engine 168 for providing marketplace to one or more users. The marketplace engine 168 enables the user to offer an asset for selling or using. The marketplace engine 168 has access to the assets 140 that the user wants to offer on the marketplace. The creative apparatus 108 also includes a search engine 170 to enable searching of the assets 140 in the marketplace. The search engine 170 is also a part of one or more application programs 128 to enable the user to perform search for the assets 140 or any other type of the application program data 130. The search engine 170 can perform a search for an asset using the metadata 142 or the file.

The creative apparatus 108 also includes a document engine 172 for providing various document related workflows, including electronic or digital signature workflows, to the user. The document engine 172 can store documents as the assets 140 in the data storage unit 112 or can maintain a separate document repository (not shown in FIG. 1).

It is to be appreciated that the engines and working of the engines are described as examples herein and the engines can be used for performing any step in providing digital experience to the user.

Extensible File Synchronization Using Custom Agents

Figure 2:
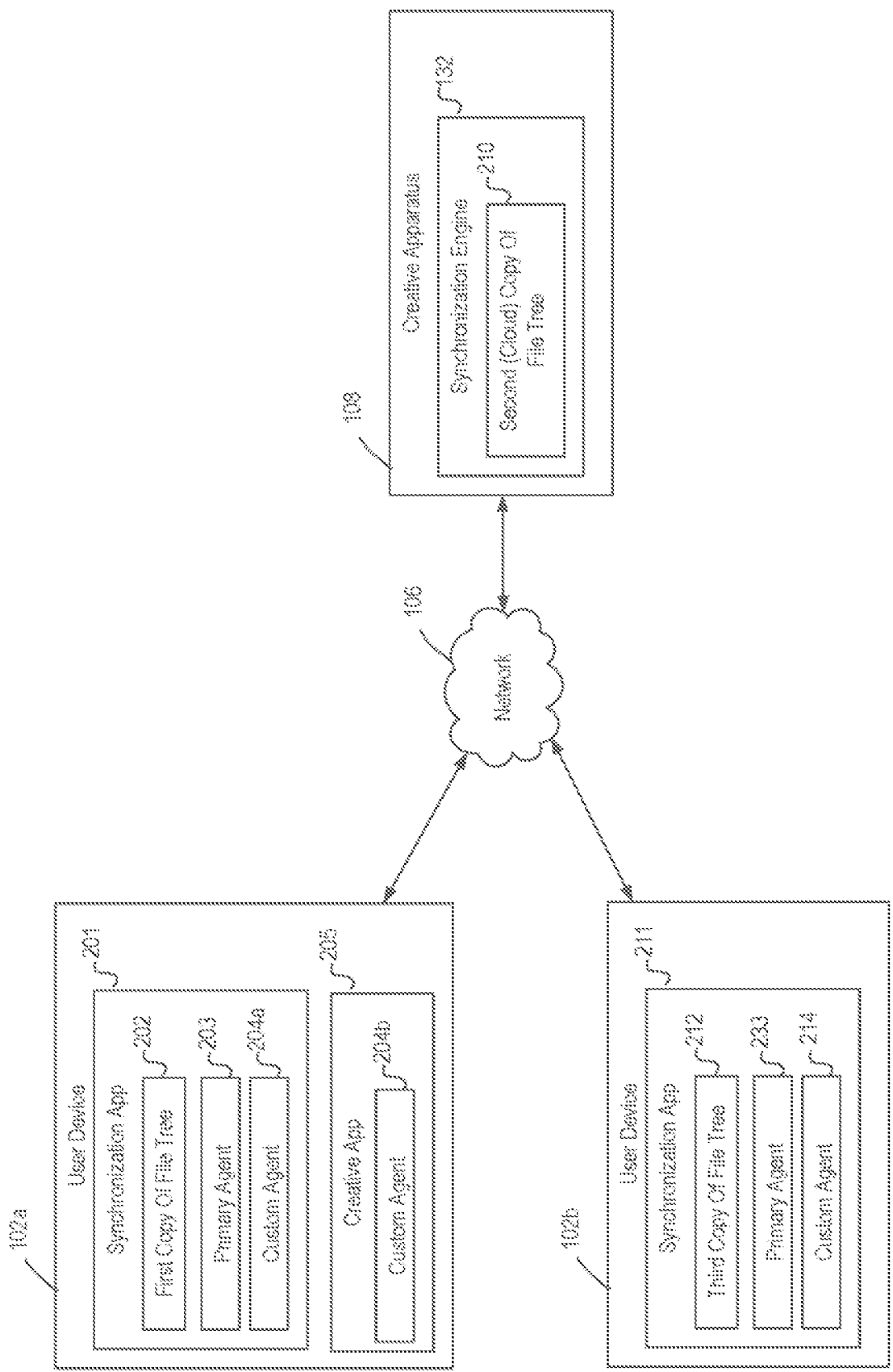
FIG. 2 illustrates exemplary components of the environment of FIG. 1 for extending file synchronization with custom synchronization procedures.

FIG. 2 illustrates exemplary components of the environment of FIG. 1 for extending file synchronization with custom synchronization procedures. In FIG. 2, a file tree is synchronized between two user devices 102a, 102b and on the creative apparatus 132. The user device 102a includes a synchronization app 201 that includes a first copy of the file tree 202. The creative apparatus 108 has synchronization engine 132 that maintains a second (cloud) copy of the file tree 210, and the user device 102b includes a synchronization app 211 that includes a third copy of the file tree 212. These copies of the file tree 201, 210, 212 are synchronized by components on the user devices 102a, 102b as described below.

The user device 102a includes a primary agent 203 and custom agents 204a, 204b. The primary agent 203 manages the synchronization of the first copy of a file tree 202 on the computing device 102a with the second (cloud) copy of the file tree 210 on the creative apparatus 108. In this example, the primary agent 203 monitors the first copy of a file tree 202 and receives updates regarding changes to the second copy of file tree 210, creates default synchronization plans, communicates with custom agents 204a, 204b to obtain custom synchronization plans, executes default and/or custom synchronization plans, and/or reports on synchronization progress. Custom agents (not shown) accessed by primary agent 203 to customize synchronization can additionally or alternatively be located on creative apparatus 108 or on another remote server (not shown).

The user device 102b includes a primary agent 233 and custom agent 214. The primary agent 233 manages the synchronization of the third copy of a file tree 212 on the computing device 102b with the second (cloud) copy of the file tree 210 on the creative apparatus 108. In this example, the primary agent 233 monitors the third copy of a file tree 212 and receives updates regarding changes to the second copy of file tree 210, creates default synchronization plans, communicates with custom agent 214 to obtain custom synchronization plans, executes default and/or custom synchronization plans, and/or reports on synchronization progress.

Figure 3:
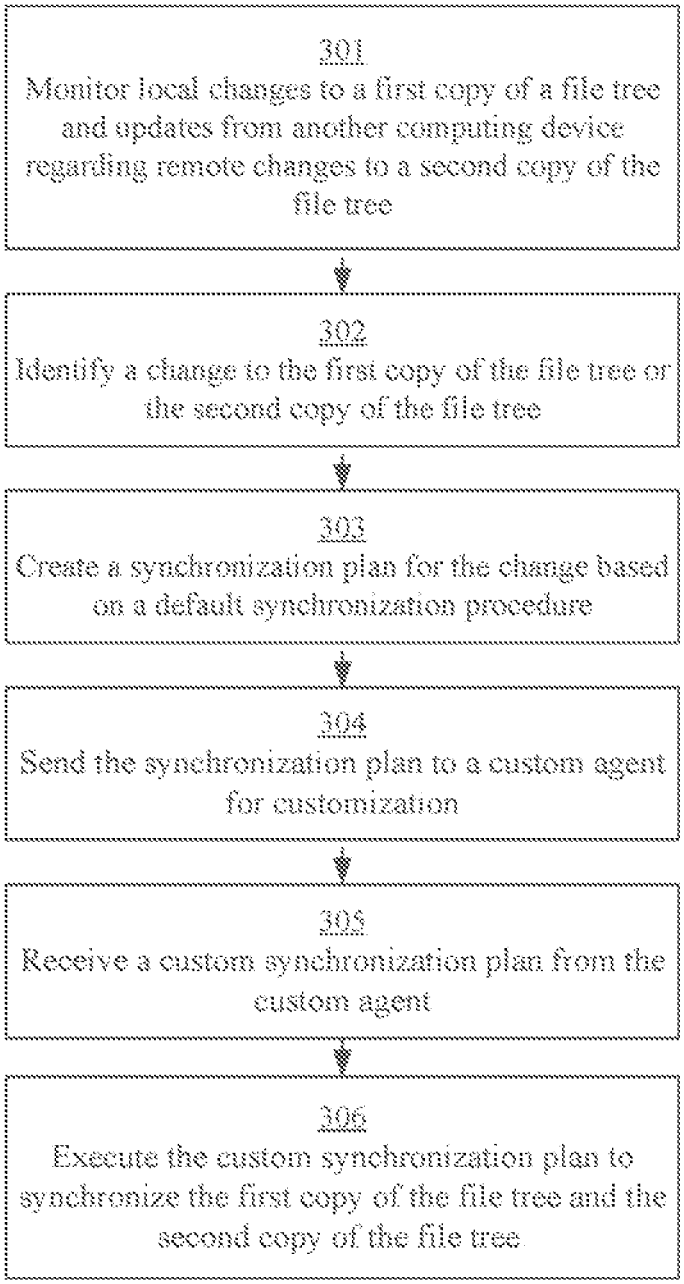
FIG. 3 illustrates is a flow chart illustrating an exemplary technique for extending a file synchronization with custom synchronization procedures.

FIG. 3 illustrates an exemplary technique 300 for extending a file synchronization with custom synchronization procedures. The exemplary technique 300 can be implemented by a primary agent such as the primary agent 203 communicating with a custom agent such as the custom agent 204a of FIG. 2, although other devices and configurations can also be implemented.

Technique 300 involves monitoring local changes to a first copy of a file tree and updates from another computer device regarding remote changes to a second copy of the file tree, as shown in block 301. In one example, the primary agent monitors the local copy of the file tree for changes by detecting creation, deletion, and update events to files and folders saved locally in memory on the computing device.

Technique 300 further involves identifying a change to the first copy of the file tree or the second copy of the file tree, as shown in block 302. Thus, when a user opens a file, makes a change to the file, and then saves the file locally, the primary agent identifies the change. Similarly, if the user creates a new file or folder, deletes a file or folder, or moves a file or folder locally, the primary agent identifies the change. When the second copy of the file tree is changed, for example, when a separate user on another device makes a change that is synchronized with the cloud server, the primary agent receives a notification that the cloud server has been changed and identifying the nature of the change.

Technique 300 further involves creating a synchronization plan for the change based on a default synchronization procedure, as shown in block 303. The synchronization plan provides an ordering of one or more actions to be executed to accomplish synchronization based on the change. The synchronization plan initially is a default synchronization plan based on a default synchronization procedure, i.e., a procedure that will be used to synchronize changes unless replaced with a custom synchronization procedure. Default synchronization procedures are specified by a default synchronization procedure source such as the business entity or team that implements the file synchronization system. The default synchronization procedures can, but do not necessarily, provide the most common synchronization actions to perform to synchronize a change based on the type of the change. For example, the most common action when new version of a file is saved locally may involve uploading the new version of the file to replace the prior version of the file on the cloud server.

The synchronization plan can be encoded as a directed acyclic graph (DAG). In such a DAG, each node represents a synchronization action such as upload, download, create directory, rename directory, etc. A DAG provides a topologically sorted order for executing synchronization actions. For example, if there is an edge from action A to action B, then A must be done before B.

Technique 300 further involves sending the synchronization plan to a custom agent for customization, as shown in block 304. The custom agent can be local on the same machine or stored on a remote server. Sending the synchronization plan can include encoding the synchronization plan (e.g., a DAG) in a suitable format. For inter-process communication (IPC) the format could be a serialized text format. For an in-process plugin, the format could be a graph of in-memory objects. Sending the synchronization plan to the custom agent can involve sending it over a public network such as the Internet to a cloud service for customization.

The custom agent receives and amends the synchronization plan to create a custom synchronization plan. For example, the custom agent can create the custom synchronization plan by deleting a node or reversing a direction of an upload or download action in the synchronization plan. The custom agent can create the custom synchronization plan using a custom synchronization procedure specified by a custom synchronization procedure source different from the default synchronization procedure source. Thus, developers, teams, business units, business entities, and others who are separate from the general file synchronization implementation can extend and customize the file synchronization capabilities without having to enlist the help of file synchronization system implementers. Rather the file synchronization is extensible and can be easily extended using a custom agent that is separate from the file synchronization general implementation and default procedures. Thus, the custom synchronization procedure source can be a second business entity or team that implements an application or business process separate from implementation of the file synchronization system. Moreover, the custom agent can be implemented in a second programming language different from a first programming language in which the file synchronization general implementation and/or default procedures are implemented. Multiple custom procedures can come from different sources and be implemented m different programming languages. This provides additional flexibility and efficiency.

Technique 300 further involves receiving a custom synchronization plan from the custom agent, as shown in block 305. After receiving the custom synchronization plan, the custom synchronization plan is checked for validity. For example, if the synchronization plan represented a DAG, the primary agent checks to ensure that the custom synchronization plan still represents a DAG. The primary agent further checks that dependencies of operations have not been wrongly deleted, that the files/folders being uploaded/downloaded do exist on the server and/or local side, and that the operations specified can be executed successfully, e.g. that no files are being creating using a system-reserved name, etc.

Technique 300 further involves executing the custom synchronization plan to synchronize the first copy of the file tree and the second copy of the file tree, as shown in block 306. For example, if a file needs to be uploaded to the server to replace an older version of the file on the server, the primary agents sends the file to the server with instructions for replacing the older version of the file with the new file.

The technique 300 of FIG. 3 can involve the use of multiple custom agents. In such cases, the primary agent can contact an appropriate custom agent for customization in a variety of ways. In one example, the primary agent keeps track of all custom agents. When the primary agent identifies a change, it sends a synchronization plan for the change to all of the custom agents. If any of the custom agents is configured to customize synchronization for that type of change, the respective custom agent responds with a custom synchronization plan. If none of the custom agents responds within a predetermined amount of time, the primary agent proceeds with executing the (default) synchronization plan.

Certain techniques of the invention involve a primary agent identifying multiple changes to a first copy of the file tree or a second copy of the file tree, sending synchronization plans for the multiple changes to multiple custom agents, receiving custom synchronization plans from the multiple custom agents, and executing the custom synchronization plans. In this way, the file synchronization system is extended with custom synchronization procedures for different circumstances based on custom procedures that can be provided by multiple, different custom procedure sources.

Figure 4:
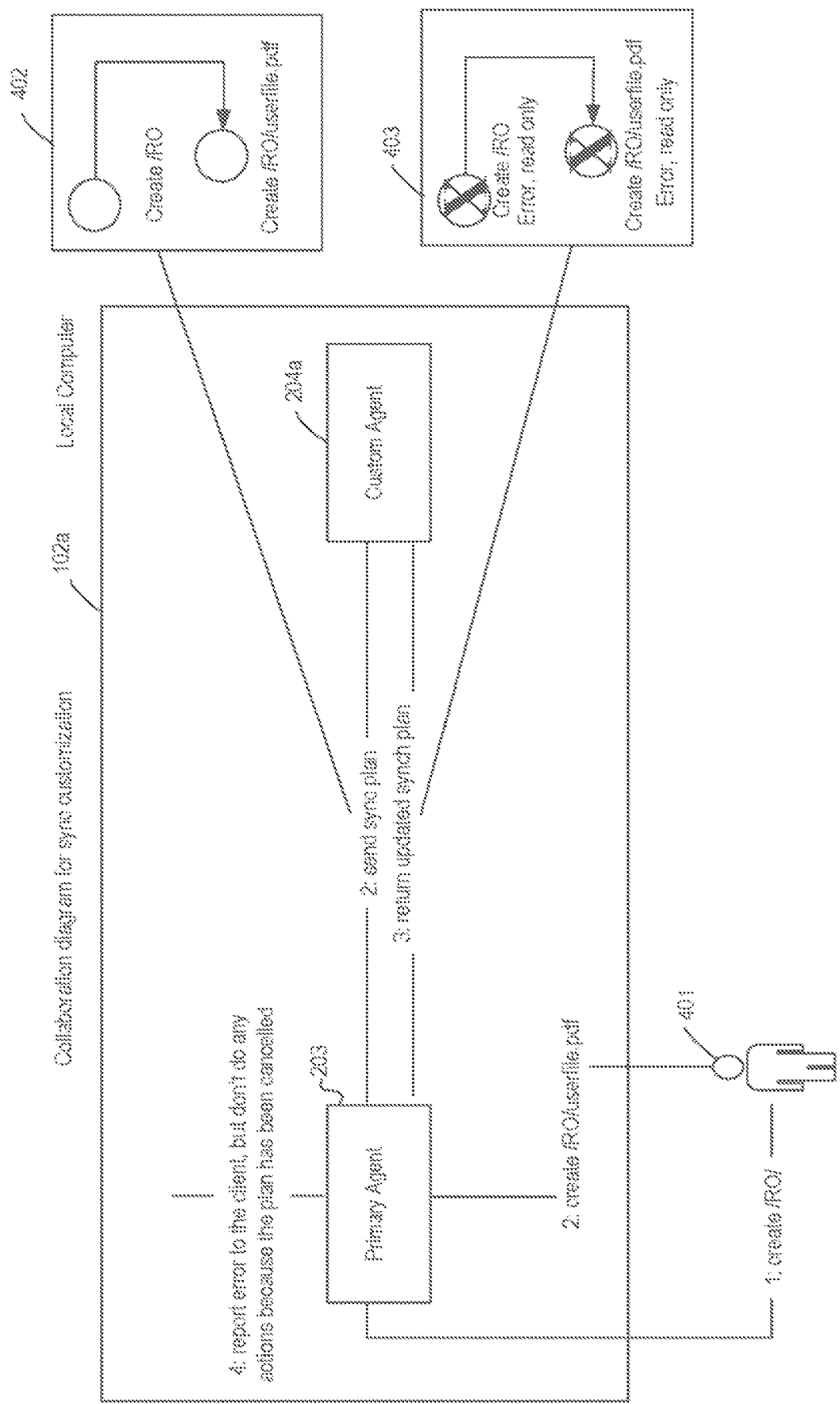
FIG. 4 illustrates is a flow chart illustrating an exemplary technique for file synchronization with custom synchronization procedures.

FIG. 4 illustrates is a flow chart illustrating an exemplary technique for file synchronization with custom synchronization procedures. User 401 first creates a folder /RO/ and then creates a file userfile.pdf. The primary agent 203 identifies these changes and sends a synchronization plan 402 to custom agent 204a. The synchronization plan 402 includes a DAG with a "create/RO" node linked to a subsequent "create/RO/userfile.pdf" node. The custom agent 204a analyzes the synchronization plan 402 and applies a custom synchronization procedure. In this case, the custom agent determines that creating the folder is not allowed because it is read only and the custom synchronization procedure for read only folders is to not allow creation of the folders. Accordingly, the custom agent deletes the nodes and produces custom synchronization plan 403, which essentially will perform no change on the server based on the local change and instead result in notifying the user that the local change was not allowed and/or cannot be synchronized with the server. The custom synchronization plan 403 is then returned to the primary agent 203 for execution.

Generally, a custom agent can identify a circumstance to customize a change based on identifying an attribute of a file, a folder, an organizational structure of a file tree, or any other appropriate characteristic associated with the change. Thus, in addition to the providing a custom agent to provide custom procedures for synchronizing read only folders and files, custom agents can be used for images, videos, files being editing by more than one user, and/or any other files of folders that have particular characteristics. In one example, custom procedures are provided for files that are used by a particular creative application. For example, custom synchronization procedures can be used to synchronize content files that are used in a web page creation application, e.g., applying special synchronization rules for images, videos, and other elements of web pages being created. In another example, custom components can be used to enforce naming requirements. Thus a custom agent can receive a change, check to see if the change involves a name that violates a naming condition, and, if so, customize the synchronization plan accordingly. In another example, custom synchronization rules can be provided for collaborations. Collaborations include one or more folders that more than one user can work together on. Unlike for conventional folder synchronization in which when a user deletes a folder or file locally the folder or file is deleted on cloud server too, a special synchronization rule for collaborations can specify that a locally deleted folder or file is to remain on the server for use by others in the collaboration. As another example, a corporate entity using the file synchronization system may use a custom synchronization procedure to enforce special requirements around data security, for example, to prevent files containing the word "private" from being uploaded to a cloud server.

The custom agents in the above examples are implemented separately from the primary agents. Thus, rather than using a single primary agent that encapsulates all of the logic for custom synchronization procedures, the logic of these procedures is separated. Splitting the logic up into multiple programs makes the software engineering simpler and more efficient. Moreover, the custom agents can be tailored to address particular circumstances and thus compartmentalize the synchronization process in an organized and easy to change and extend manner.

Extensible File Synchronization Using Delegates

Figure 5:
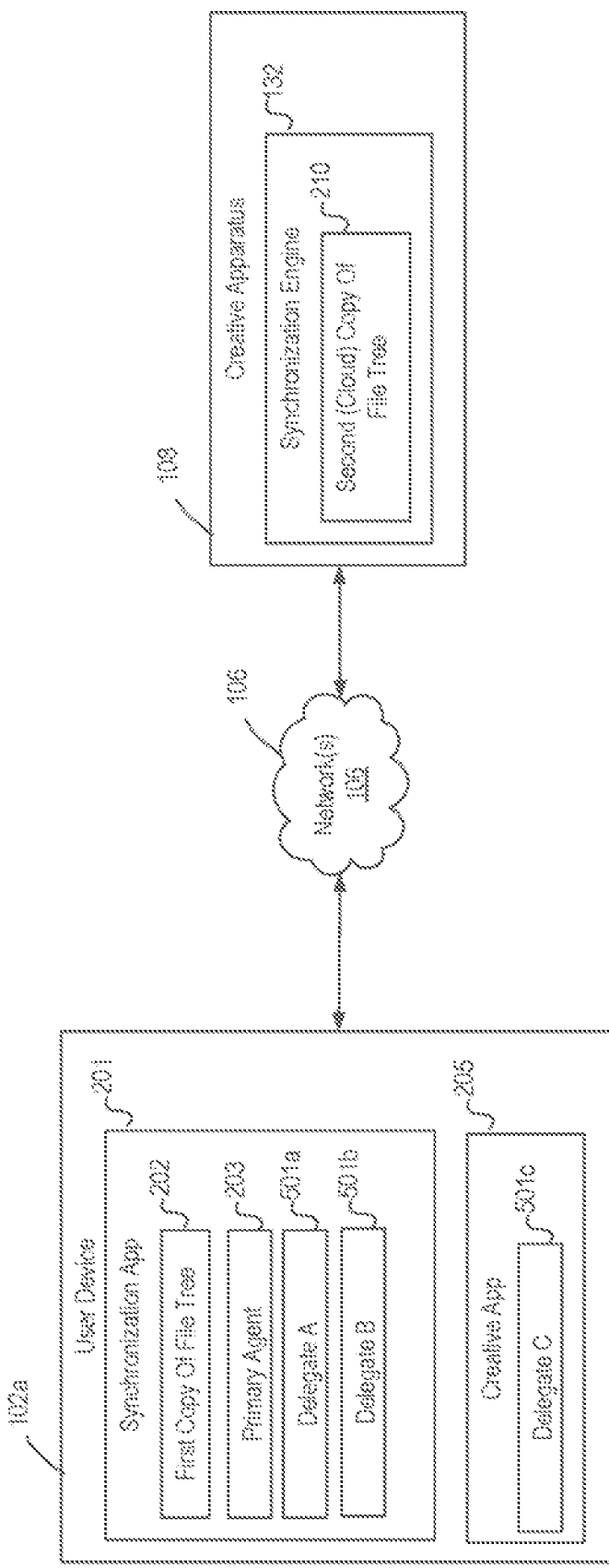
FIG. 5 illustrates exemplary components of the environment of FIG. 1 for extending file synchronization with delegated synchronization control.

FIG. 5 illustrates exemplary components of the environment of FIG. 1 for extending file synchronization with delegated synchronization control. In FIG. 5, a file tree is synchronized between the user devices 102a and the creative apparatus 132. The user device 102a includes a synchronization app 201 that includes a first copy of the file tree 202. The creative apparatus 108 has synchronization engine 132 that maintains a second (cloud) copy of the file tree 210. These copies of the file tree 201,210, are synchronized by components on the user devices 102a as described below.

The user device 102a includes a primary agent 203 and delegates 501a-c. The primary agent 203 manages the synchronization of the first copy of a file tree 202 on the computing device 102a with the second (cloud) copy of the file tree 210 on the creative apparatus 108. In this example, the primary agent 203 monitors the first copy of a file tree 202 and receives updates regarding changes to the second copy of file tree 210, identifies which delegates are registered to synchronize particular changes based on delegate registration, and delegates responsibility for synchronizing changes to the delegates. The primary agent 203 and delegates 501a-c communicate via any IPC mechanism, e.g., remote procedure call (RPC), datagram, custom protocol, HTTP, etc., or via any other appropriate communication technique.

In this example, the primary agent 203 orchestrates synchronization by using delegates 501a-c that control different portions of the file tree. The delegates 501a-c are able to implement custom synchronization procedures because they are separate from the primary agent 203. Moreover, use of the delegates 501a-c makes synchronization quicker, more efficient, and avoids bottlenecks. Each of the delegates 501a-c receives information about changes to its respective portion of the file tree and uses custom procedures for changes in that portion. The delegates 501a-c create custom synchronization plans for changes and instruct the primary agent 203 to execute the plans. Unlike custom agents described above with respect to FIGS. 2-3, the delegates 501a-c actually control the synchronization rather than simply amending a synchronization plan. The delegates 501a-c are making the synchronization decisions without oversight from the primary agent 203, which simply executes the synchronizations as instructed by the delegates 501a-c.

Figure 6:
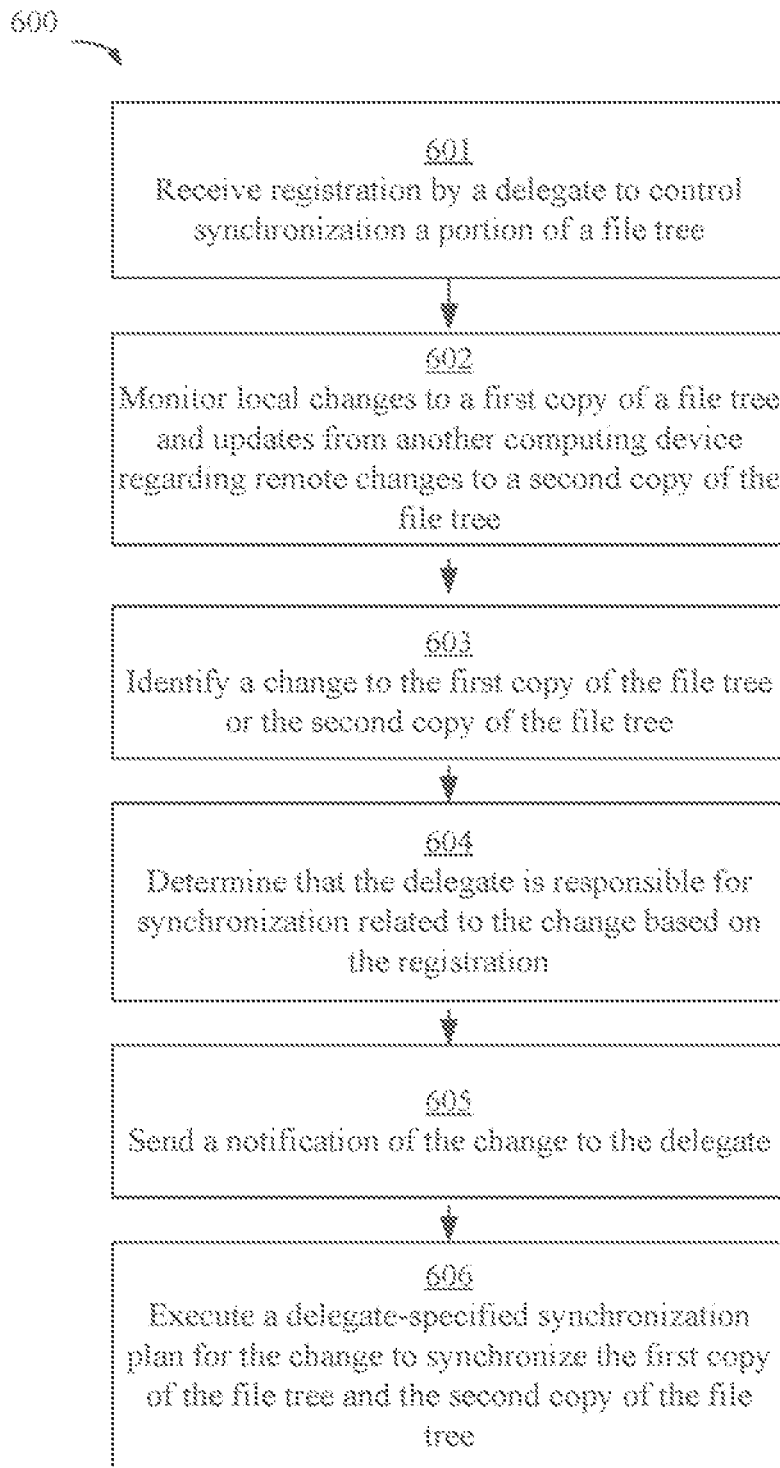
FIG. 6 is exemplary flow chart illustrating an exemplary technique for delegating synchronization procedures.

FIG. 6 is exemplary flow chart illustrating an exemplary technique 600 for delegating synchronization procedures. The exemplary technique 600 can be implemented by a primary agent such as the primary agent 203 communicating with delegates 501a-c of FIG. 5, although other devices and configurations can also be implemented.

Technique 600 involves receiving registration by a delegate to control synchronization of a portion of a file tree, as shown in block 601. In an implementation involving multiple delegates, multiple registrations can be received and tracked using a list or other appropriate storage technique. The multiple delegates can register for different portions of the file tree. For example, one delegate can register for all folders and files with folder A, another delegate can register for all folders and files within Folder B, etc. A portion of a file tree can thus be a folder and all of its sub-folders and files. In another example, a portion of a file tree is files of a particular type. In this example, a delegate can be registered to synchronize particular file types. As a specific example, a delegate can be registered to synchronize video files using custom synchronization procedures that are appropriate for video files.

In one technique, when synchronization is commenced by the primary agent, delegates have a limited amount of time to register to control a part of the file tree. Once synchronization begins running, delegates can no longer register and the files that have not been delegated are synced using default synchronization procedures by the primary agent. Delegates provide a list of paths that they wish to control, or a list of file types, or other criteria. The primary agent will check before registration is complete that no file is controlled by two delegates and resolves any conflicts. When a delegate is in control of a portion of the file tree, the primary agent will not download or upload any changes in those files until instructed to do so by the appropriate delegate.

Technique 600 further involves monitoring changes to a first copy of a file tree and updates from another computing device regarding remote changes to a second copy of the file tree, as shown in block 602. In one example, the primary agent monitors the local copy of the file tree for changes by detecting creation, deletion, and update events to files and folders saved locally in memory on the computing device.

Technique 600 further involves identifying a change to the first copy of the file tree or the second copy of the file tree, as shown in block 603. Thus, when a user opens a file, makes a change to the file, and then saves the file locally, the primary agent identifies the change. Similarly, if the user creates a new file or folder, deletes a file or folder, or moves a file or folder locally, the primary agent identifies the change. When the second copy of the file tree is changed, for example, when a separate user on another device makes a change that is synchronized with the cloud server, the primary agent receives a notification that the cloud server has been changed and identifying the nature of the change.

Technique 600 further involves determining that the delegate is responsible for synchronization related to the change based on the registration, as shown in block 604. For example, if the change affects a file with a folder in the portion of the file tree for which the delegate is responsible, the primary agent determines that the delegate is responsible for synchronization related to the change.

The primary agent can employ conflict resolution procedures to address particular circumstances in which a change affects multiple portions of a file tree, both within and beyond the scope of a delegate's responsibility. For example, if the primary agent determines that a change requires deleting or moving a parent folder of the portion registered to the delegate, where the delegate is not responsible for the parent folder, the primary agent can delete or move the parent folder and the portion within it registered to the delegate. This avoids a potential conflict. In another example, the primary agent identifies that a change requires moving a file or folder from a first portion of the file tree for which the delegate registered to a second portion of the file tree for which a second delegate registered. In this circumstance, the primary agent breaks the move up into a deletion and a creation that can be separately handled by the different delegates each handling the operation relevant to its own portion of the file tree.

Technique 600 further involves sending a notification of the change to the delegate, as shown in block 605. Technique 600 further involves executing a delegate-specified synchronization plan for the change to synchronize the first copy of the file tree and the second copy of the file tree, as shown in block 606.

Extensible file synchronization techniques that use delegates can employ various mechanisms to provide efficient, fast, and manageable synchronization. A first mechanism is the delegate registration process discussed above with respect to block 601 that makes it easy for delegates to be added to the system.

A second mechanism is the change monitoring process discussed above with respect to blocks 602 and 603 that identifies changes and responsible delegates. In change monitoring, the primary agent will receive updates about changes to the file tree on other computers, as well as monitor for changes on the local disk. Notifications about delegated files are sent to delegates so that they will have the information necessary to keep the files in synchronization according to their own business logic.

A third mechanism is a conflict resolution process discussed above with respect to block 604 for handling potential conflicts between delegates and the primary agent and/or themselves. In handling of conflicting operations, certain operations that happen locally (on the local machine) and remotely (on another machine synchronizing the same file tree) may affect the primary agent and/or multiple delegates. The techniques can ensure that each delegate only downloads and uploads changes to their own portion of the synchronization tree. To do so, the primary agent must enforce rules about what happens in conflict situations. The rules are designed to ensure that each conflicting operation is handled by exactly one agent, with other agents being informed where necessary.

A fourth mechanism is an execution mechanism. In one implementation, the primary agent provides IPC facilities allowing the delegates to set up transfers for the file tree portions that each controls. The transfers cause downloads from other computers synchronizing the file tree or cause uploads to other computers synchronizing the file tree. Once the delegate processes the changes that have been received and made a decision about what actions it wants to perform locally and on the server. The delegate encodes the actions and hands it to primary agent to be executed. This keeps the execution procedures in a single location at the primary agent. In an alternative implementation, delegates perform the some or all of the synchronization actions themselves.

A fifth mechanism provides for aggregation of synchronization progress and state. In one implementation, the primary agent reports state, e.g. actively synchronizing, or progress, e.g. synchronized 1 file of N files, for display on the user device and/or to a synchronization administrator. In certain techniques of the invention, delegates provide their own state and progress to the primary agent, which will aggregate the information into a single status report displayed or otherwise provided to the user.

There are numerous advantages to being able to delegate to delegates rather than have a single process perform all synchronizations, including custom synchronization procedures. First, there is a static advantage. Essentially the use of delegates makes it easy to implement different synchronization procedures for different circumstances. If there is a desire for a policy to not synchronize particular file types, the synchronization of those file types can be easily controlled using a targeted delegate. Similarly, if there is a desire for a policy to not synchronize files older than six months, the synchronization of those file types can be easily controlled using another targeted delegate. Second there are non-static advantages. For example, an organization is able to use synchronization procedures to control when information is synchronized to user devices. As a specific example, in compliance practices, certain tasks need to be performed every monthly, quarter, every six months, etc. Synchronization procedures implemented via delegates can enable the company to use synchronization to push content onto employees' machines that are relevant to those particular compliance or other business activity at the relevant times.

Delegates can also be used to enforce a particular order of synchronization actions. For example, a particular type of creative content can include a key file and linked files. The creative content uses a compound file format in which the order of synchronization needs to be specified, e.g., the document with the layout should synchronized first, etc.

Exemplary Computing Environment

Figure 7:
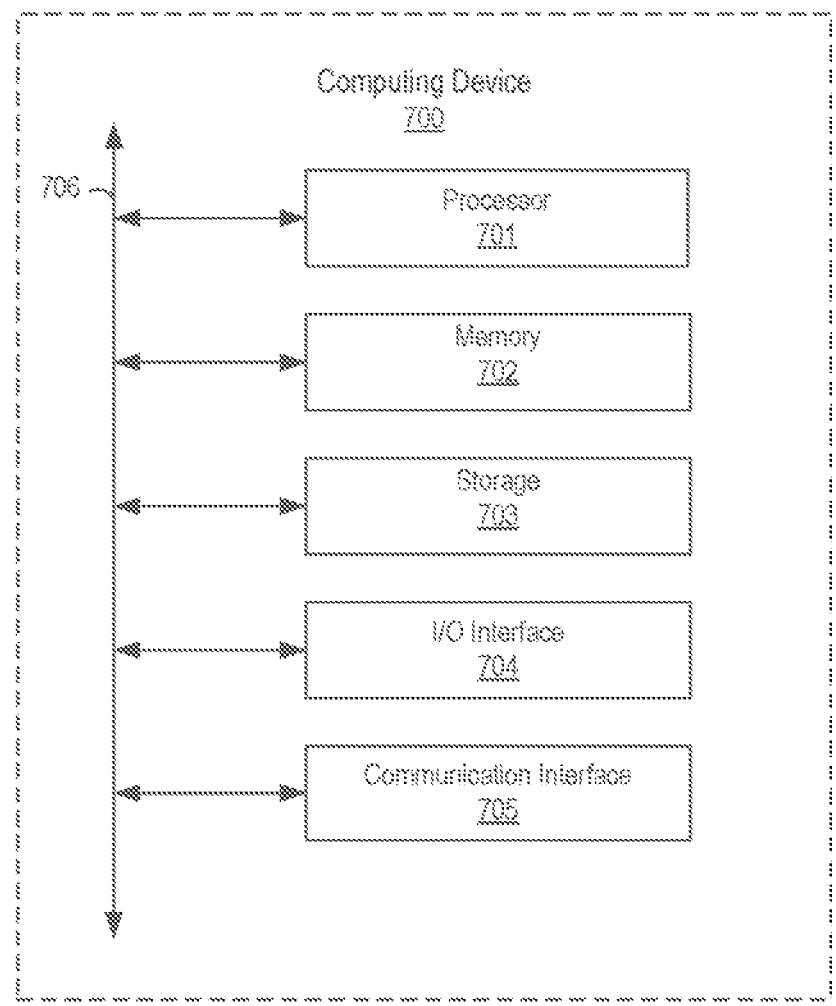
FIG. 7 is a block diagram depicting an example hardware implementation.

Any suitable computing system or group of computing systems can be used to implement the techniques and methods disclosed herein. For example, FIG. 7 is a block diagram depicting examples of implementations of such components. The computing device 70 can include a processor 71 that is communicatively coupled to a memory 72 and that executes computer-executable program code and/or accesses information stored in memory 72 or storage 73. The processor 71 may comprise a microprocessor, an application-specific integrated circuit ("ASIC"), a state machine, or other processing device. The processor 71 can include one processing device or more than one processing device. Such a processor can include or may be in communication with a computer-readable medium storing instructions that, when executed by the processor 71, cause the processor to perform the operations described herein.

The memory 72 and storage 73 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 70 may also comprise a number of external or internal devices such as input or output devices. For example, the computing device is shown with an input/output ("I/O") interface 74 that can receive input from input devices or provide output to output devices. A communication interface 75 may also be included in the computing device 70 and can include any device or group of devices suitable for establishing a wired or wireless data connection to one or more data networks. Non-limiting examples of the communication interface 75 include an Ethernet network adapter, a modem, and/or the like. The computing device 70 can transmit messages as electronic or optical signals via the communication interface 75. A bus 76 can also be included to communicatively couple one or more components of the computing device 70.

The computing device 70 can execute program code that configures the processor 71 to perform one or more of the operations described above. The program code can include one or more modules. The program code may be resident in the memory 72, storage 73, or any suitable computer-readable medium and may be executed by the processor 71 or any other suitable processor. In some embodiments, modules can be resident in the memory 72. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method, performed by a computing device, for extending a file synchronization system with custom synchronization procedures, the method comprising:
monitoring, by a primary agent on the computing device, local changes to a first copy of a file tree and updates from another computing device regarding remote changes to a second copy of the file tree;

identifying, by the primary agent, a change to the first copy of the file tree or the second copy of the file tree;

creating, by the primary agent, a synchronization plan for the change, wherein the synchronization plan comprises a directed acyclic graph (DAG) including a set of synchronization actions to be executed by the primary agent, and an ordering of the set of synchronization actions represented, wherein the set of synchronization actions comprises at least one of upload file, move file, rename file, download file, delete file, create directory, move directory, rename directory, download directory, and delete directory;

sending, by the primary agent via electronic communication, the synchronization plan to a custom agent for customization, including the set of synchronization actions to be executed by the primary agent and an attribute associated with the change;

receiving, by the primary agent via electronic communication, a custom synchronization plan from the custom agent, wherein the custom agent determined, based on the attribute, a requirement to create the custom synchronization plan and created the custom synchronization plan by modifying the DAG representing the synchronization plan, wherein the custom synchronization plan includes at least one of the set of synchronization actions; and modifying, by the primary agent, files of the first copy of the file tree or the second copy of the file tree based on the custom synchronization plan.

2. The method of claim 1, wherein creating the synchronization plan comprises the primary agent using a default synchronization procedure specified by a default synchronization procedure source, and wherein the custom agent creates the custom synchronization plan using a custom synchronization procedure specified by a custom synchronization procedure source different from the default synchronization procedure source.

3. The method of claim 2, wherein the default synchronization procedure source is a first business entity or team that implements the file synchronization system; and the custom synchronization procedure source is a second business entity or team that implements an application or business process separate from implementation of the file synchronization system.

4. The method of claim 1, wherein creating the synchronization plan comprises the primary agent using a first program developed in a first programming language, wherein the custom agent creates the custom synchronization plan using a second program developed in a second programming language different from the first programming language.

5. The method of claim 1, further comprising:
identifying, by the primary agent, multiple changes to the first copy of the file tree or the second copy of the file tree; and
executing, by the primary agent, the custom synchronization plan to synchronize the first copy of the file tree and the second copy of the file tree with respect to the multiple changes.

6. The method of claim 1, wherein sending, by the primary agent, the synchronization plan to the custom agent for customization comprises sending the synchronization plan locally to the custom agent on the computing device.

7. The method of claim 1, wherein sending, by the primary agent, the synchronization plan to the custom agent for customization comprises sending the synchronization plan to the custom agent on a remote computing device.

8. The method of claim 1, wherein creating the synchronization plan comprises creating the DAG, wherein nodes of the DAG represent the set of synchronization actions performed in a topologically sorted order when the synchronization plan is executed.

9. The method of claim 8, wherein creating the synchronization plan comprises representing the DAG in a serialized text format or graph of in-memory objects.

10. The method of claim 8, wherein the custom agent creates the custom synchronization plan by deleting, renaming, or moving a node, changing an add to a delete, or reversing a direction of an upload or download action.

11. The method of claim 8, further comprising checking, by the primary agent, that the custom synchronization plan has a same graph structure as the synchronization plan created by the primary agent by ensuring that the DAG is still directed and a-cyclical.

12. A method comprising:
monitoring local changes to a first copy of a file tree and updates from another computing device regarding remote changes to a second copy of the file tree;
identifying a change to the first copy of the file tree or the second copy of the file tree;
creating, by a primary agent, a synchronization plan for the change, wherein the synchronization plan comprises a directed acyclic graph (DAG) including a set of synchronization actions to be executed by the primary agent, and an ordering of the set of synchronization actions represented, wherein the set of synchronization actions comprises at least one of upload file, move file, rename file, download file, delete file, create directory, move directory, rename directory, download directory, and delete directory;
creating, by a custom agent, a custom synchronization plan by modifying the DAG, wherein the custom synchronization plan includes at least one of the set of synchronization actions; and
modifying, by the primary agent, files of the first copy of the file tree or the second copy of the file tree based on the custom synchronization plan.

13. The method of claim 12, wherein creating the synchronization plan comprises the primary agent using a default synchronization procedure specified by a default synchronization procedure source, and wherein the custom agent creates the custom synchronization plan using a custom synchronization procedure specified by a custom synchronization procedure source different from the default synchronization procedure source.

14. The method of claim 13, wherein a default synchronization procedure source is a first business entity or team that implements a file synchronization system; and the custom synchronization procedure source is a second business entity or team that implements an application or business process separate from implementation of the file synchronization system.

15. The method of claim 12, wherein creating the synchronization plan comprises the primary agent using a first program developed in a first programming language, wherein the custom agent creates the custom synchronization plan using a second program developed in a second programming language different from the first programming language.

16. The method of claim 12, further comprising:
identifying, by the primary agent, multiple changes to the first copy of the file tree or the second copy of the file tree; and
executing, by the primary agent, the custom synchronization plan to synchronize the first copy of the file tree and the second copy of the file tree with respect to the multiple changes.

17. The method of claim 12, wherein creating the synchronization plan comprises creating the DAG, and wherein nodes of the DAG represent the set of synchronization actions performed in a topologically sorted order when the synchronization plan is executed.

18. A system for file synchronization with custom synchronization procedures, the system comprising:
one or more processors; and
one or more non-transitory computer readable mediums comprising instructions, wherein, when the instructions are executed, at least one of the one or more processors performs operations comprising:
monitoring, at a primary agent, local changes to a first copy of a file tree and updates from another computing device regarding remote changes to a second copy of the file tree;
identifying a change to the first copy of the file tree or the second copy of the file tree;
creating, by the primary agent, a synchronization plan for the change, wherein the synchronization plan comprises a directed acyclic graph (DAG) including a set of synchronization actions to be executed by the primary agent, and an ordering of the set of synchronization actions represented, wherein the set of synchronization actions comprises at least one of upload file, move file, rename file, download file, delete file, create directory, move directory, rename directory, download directory, and delete directory;
sending, by the primary agent via electronic communication, the synchronization plan to a custom agent, and a second custom agent, including the set of synchronization actions to be executed by the primary agent and an attribute associated with the change;
receiving a custom synchronization plan and a second custom synchronization plan at the primary agent via electronic communication;
validating, by the primary agent, the custom synchronization plan and the second custom synchronization plan;
modifying, by the primary agent, the first copy of the file tree and the second copy of the file tree based on the custom synchronization plan;
receiving, at each of the custom agent and the second custom agent, the synchronization plan, including determining, based on the attribute, a requirement to create the custom synchronization plan and the second custom synchronization plan, respectively;
creating, by the custom agent and the second custom agent, the custom synchronization plan and the second custom synchronization plan, respectively, by modifying the DAG representing the synchronization plan, wherein each of the custom synchronization plan and the second custom synchronization plan includes at least one of the set of synchronization actions; and
sending, by the custom agent and the second custom agent, the custom synchronization plan and the second custom synchronization plan, respectively, to the primary agent.

19. The system of claim 18, wherein:
creating the synchronization plan comprises the primary agent using a default synchronization procedure specified by a default synchronization procedure source;
creating the custom synchronization plan comprises the custom agent using a custom synchronization procedure specified by a custom synchronization procedure source different from the default synchronization procedure source; and
creating the second custom synchronization plan comprises the second custom agent using a second custom synchronization procedure specified by a second custom synchronization procedure source different from the default synchronization procedure source.

* * * * *